Figure 1:
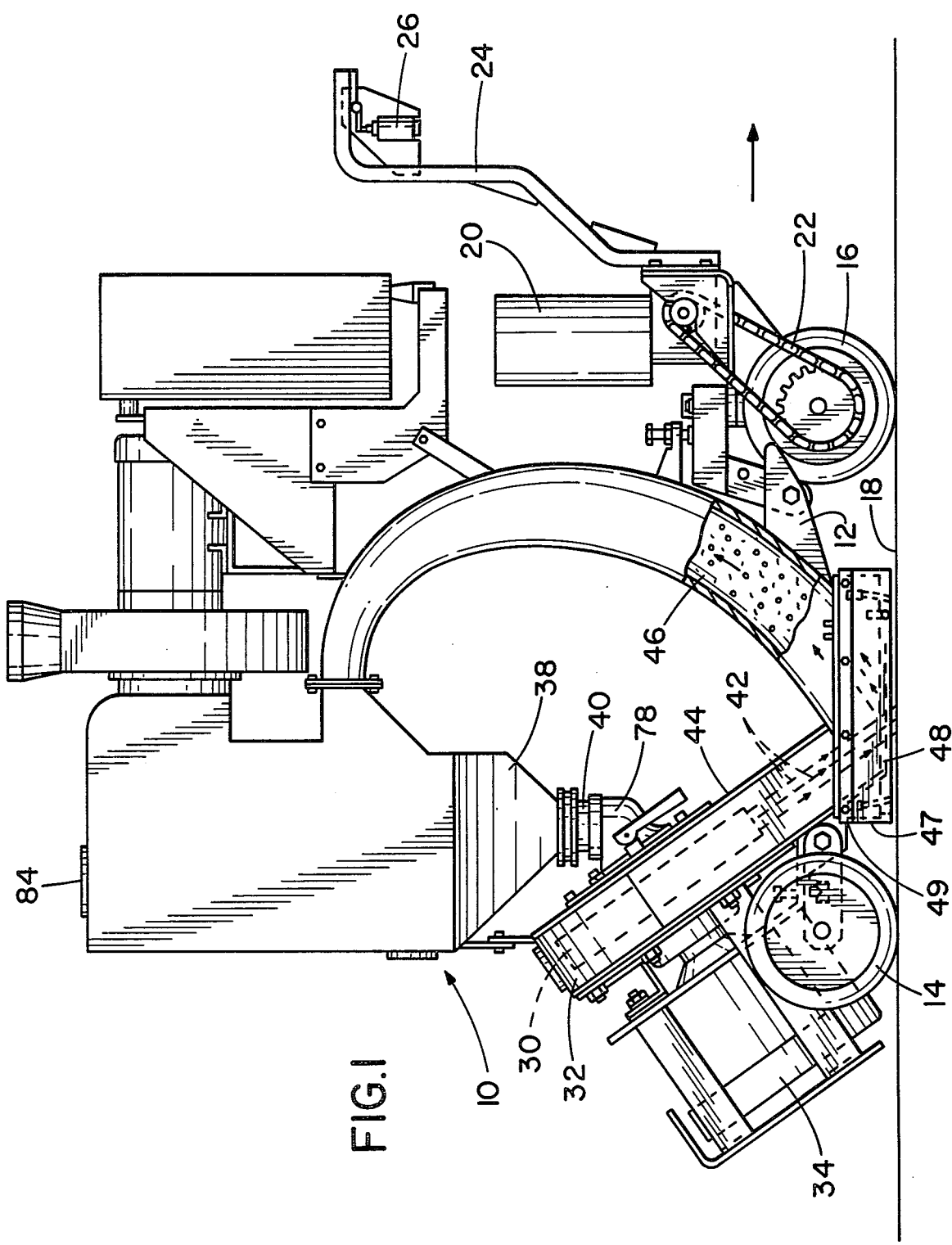

United States Patent [19]

Van Fossen

[11] 4,275,531
[45] Jun. 30, 1981

[54] ABRASIVE PARTICLE BLAST APPARATUS FOR SURFACE TREATMENT

[75] Inventor: Harvey G. Van Fossen, Mishawaka, Ind.

[73] Assignee: Wheelabrator-Frye, Inc., Hampton, N.H.

[21] Appl. No.: 95,771

[22] Filed: Nov. 19, 1979

Related U.S. Application Data

[63] Continuation-in-part of Ser. No. 925,116, Jul. 17, 1978, Pat. No. 4,202,142.

[51] Int. Cl.³ .............................. B24C 3/06; B24C 9/00
[52] U.S. Cl. .......................................... 51/425; 51/436
[58] Field of Search .................. 51/424, 425, 429, 432, 51/433, 436

[56] References Cited

U.S. PATENT DOCUMENTS

| 2,475,215 | 7/1949 | Barker | 51/436 |
| 3,385,006 | 5/1968 | Miller | 51/417 X |
| 3,877,175 | 4/1975 | Snyder | 51/429 X |
| 4,020,596 | 5/1977 | Bergh | 51/425 |
| 4,080,760 | 3/1978 | Leliaert | 51/425 |

FOREIGN PATENT DOCUMENTS 1539571  1/1979  United Kingdom ............ 51/425

Primary Examiner—Gary L. Smith
Attorney, Agent, or Firm—McDougall, Hersh & Scott

[57] ABSTRACT

Recovery and feed system for abrasive blast in surface treatment comprising treatment and return by air to separate spent abrasive particles from dust and dirt and collecting the separated abrasive particles in a chamber, automatically withdrawing fresh abrasive particles from a storage bin when the recycle falls below a predetermined level in the chamber.

8 Claims, 3 Drawing Figures

ABRASIVE PARTICLE BLAST APPARATUS FOR SURFACE TREATMENT

This is a continuation-in-part of my copending application Ser. No. 925,116, filed July 17, 1978, now U.S. Pat. No. 4,202,142 and entitled "Abrasive Particle Blast Apparatus for Surface Treatment".

This invention relates to apparatus for protecting dry particulate material, such as steel shot, steel grit or other particulate abrasive, as in the airless blasting of surfaces with particulate material therein at high velocity from blades extending radially from one or more wheels for cleaning, finishing or abrading such surfaces, and it relates more particularly to a means for separation of such particulate material from entrained dust or dirt for recycle of the particulate material to the throwing wheel.

Apparatus for projecting particulate material at high velocity for cleaning and for surface treatment are well known in the trade, as represented by apparatus marketed under the trade name WHEELABRATOR by Wheelabrator-Frye Inc. at Mishawaka, Ind. Such apparatus has generally been of large capacity and installed in stationary equipment whereby dust controls of relatively large configuration could be employed for the removal of dust and dirt from spent particulate to enable recycle of the particulate to the blasting wheel.

Such centrifugal blasting wheels have been incorporated in portable equipment for treatment of surfaces such as floors, ships' decks, airport runways and the like for cleaning abrasives or finishing such surfaces. Reference can be made to the following patents and patent applications for portable surface treating apparatus of the type described, namely: Pawlson U.S. Pat. No. 3,034,062; Diehn U.S. Pat. No. 3,900,969, Goff U.S. Pat. No. 3,977,128; Bergh U.S. Pat. No. 4,052,820 and the pending U.S. application Ser. No. 662,467, filed Mar. 1, 1976, and entitled "Portable Device for Treating Surfaces."

With such portable apparatus, it is impractical to make use of large storage capacity for carrying sufficient abrasive particles for operation of the apparatus continuously over a period of time and it is also undesirable to make use of large size dust collectors of the type conventionally used with stationary systems.

It is an object of this invention to produce and to provide apparatus of the type described which embodies sufficient capacity and operation efficiency for cleaning the spent abrasive to enable recycle for use and which embodies means controlling the recycle as well as the addition of fresh abrasive particles in a manner to reduce the volume of abrasive required to be carried for continuous operation of the equipment over a desired length of time.

Figure 2:
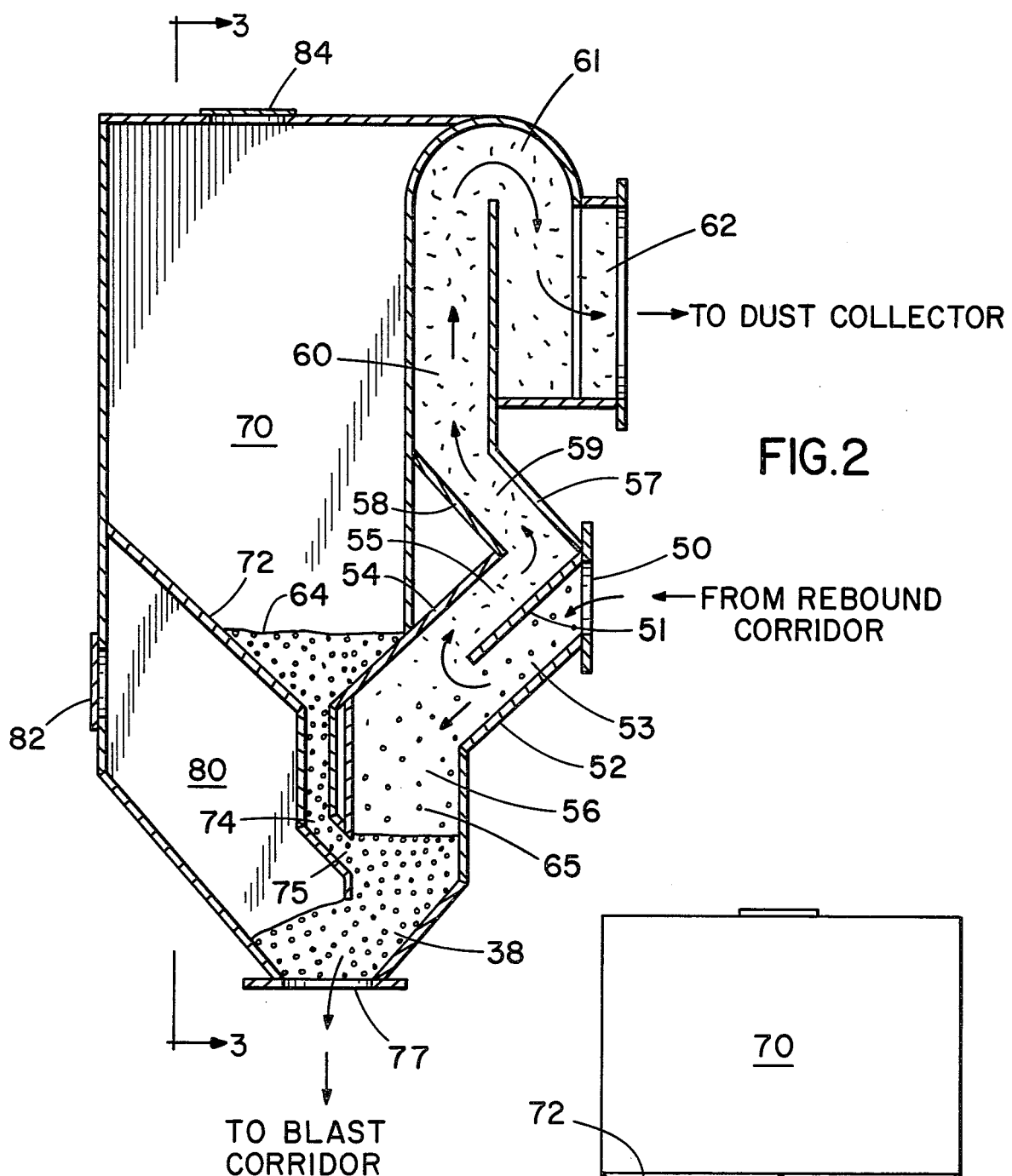
Figure 3:
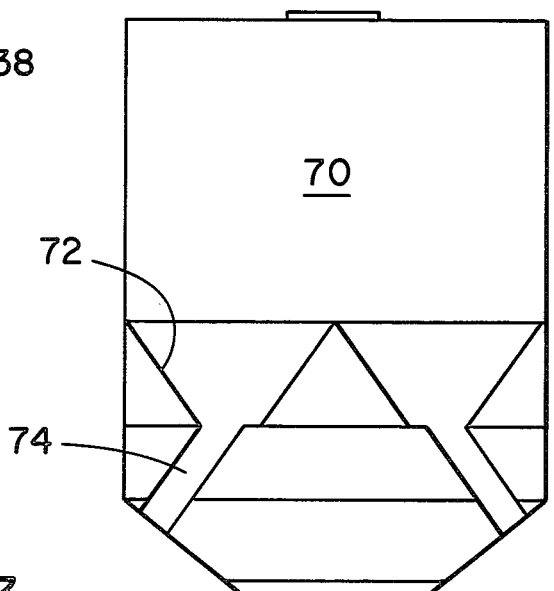

These and other objects and advantages of this invention will hereinafter appear and for purposes of illustration, but not of limitation, an embodiment of the invention is shown in the accompanying drawing in which, FIG. 1 is an elevational view of a portable surface treating apparatus embodying the features of this invention, FIG. 2 is a schematic sectional elevational view of the portion of the apparatus embodying the features of this invention, including the separator, storage and feed sections, and FIG. 3 is a schematic side elevational view of the storage and feed sections taken along line 3—3 in FIG. 2.

The invention will be described with reference to a portable apparatus for cleaning horizontally disposed, relatively flat surfaces, such as floors, ships' decks, airport runways, sidewalks, streets and the like. It will be understood, however, that the abrasive cleaning and feed means can be used with other types of abrasive blast devices, such as described in the aforementioned patents, in stationary abrasive blast equipment, or equipment for projecting abrasive particles, shot or grit onto surfaces other than flat or on surfaces other than horizontal.

While the invention will hereinafter be described with reference to the use of hard abrasive particles for treatment of the surfaces, it will be understood that the apparatus embodying the features of this invention has application also in the treatment of surfaces with other particulate material, such as for use in cleaning various types of surfaces, hardening metal surfaces as by shot peening or impacting, removal of surface corrosion or coatings, or for providing predetermined finish, such as a mat finish to a metal surface. The type of particulate material would depend somewhat on the type of surface treatment and the composition of the surface being treated and, for such purposes, the particulate is usually selected of steel shot, steel grit, metal abrasive and the like.

Referring now to the drawing, illustration is made of an apparatus 10 which includes a rigid frame 12 mounted on wheels 14, one of which is in the form of a caster wheel 16 for enabling movement of the apparatus in various directions over the surface 18 to be treated. In the illustrated modification, the apparatus is powered by a drive motor 20 mounted on the frame and connected by drive chain 22 to the caster wheel 16 to provide a self-powered apparatus for movement over the surface. A handle bar 24 extends forwardly and upwardly from the caster wheel support to enable the operator to guide the unit over the surface. A control box 26 is mounted adjacent the handle portion for controlling the operation of the drive motor 20. A platform, not shown, can be provided on the frame on which the operator can ride. Instead the operator can walk along the apparatus or, if of sufficiently light weight, the operator himself can provide the power for guided movement of the apparatus over the surface.

The apparatus is provided with one or more wheels 30 enclosed within a wheel housing 32. The wheel 30, generally referred to as a centrifugal blasting wheel of the type well known to the trade and marketed by Wheelabrator-Frye Inc. of Mishawaka, Indiana under the name WHEELABRATOR, has a number of equidistantly spaced blades extending radially outwardly from a center hub. The wheel is rotated at high speed by an electrical motor 34. Instead of a direct motor drive as illustrated, rotational movement of the wheel at high speed can be imparted to the wheel by indirect drive, such as by means of an endless belt drive entrained about a pulley on the wheel axle and a pulley fixed for rotational movement on a drive shaft.

Abrasive particles are fed from a supply hopper 38 through a magnetic valve 40 and then through a feed spout 78 to a cage in the center of the wheel. The cage dispenses the abrasive particles onto the inner ends of the blades and, in response to rotational movement of the wheel at high speed, the abrasive particles 42 are displaced radially outwardly over the surface of the blades, and thrown with high centrifugal force from the ends of the blades in the direction controlled by the cage. The return of flow of particulate material is controlled by a control valve in the feed system.

In the illustrated modification, the wheel is inclined so that the abrasive particles 42 will be thrown from the blades angularly downwardly through a similarly inclined blast corridor 44 onto the surface 18 to be treated. When the abrasive particles are thrown at high velocity angularly onto the surface 18, they rebound from the surface at about a reflective angle for recovery of the spent abrasive for reuse, there is provided a rebound corridor 46 which extends forwardly from the surface at an angle corresponding to the reflective angle ±15° from the angle of the blast corridor.

The blast corridor and the rebound corridor extend upwardly at their respective angles from a downwardly facing opening 48 which defines the blast area through which the abrasive particles are thrown onto the facing surface and from which they rebound for return through the rebound corridor.

The blast area is enclosed by a resilient skirt 47 which depends from a bracket 49 fixed to the lower edge portion of the folding walls. The skirt is intended to enclose the area to confine the blast and to prevent ricocheting of the abrasive particles to regions outside of the housing. The skirt 47 is characterized by sufficient flexibility to permit abrasive particles which come to rest on the surface 18 to pass beneath the skirt and to permit air to be drawn about the underside of the skirt from the outside atmosphere and into the blast area, as will hereafter be described. For this purpose, the skirt is formed of rubberlike material dimensioned preferably to engage the surface or to terminate a short distance above the surface.

The traverse of the spent abrasive particles through the rebound corridor 46 and recovery for reuse can be assisted in a number of ways. One way described in the copending application Ser. No. 662,467, filed Mar. 1, 1976, is to induce a relatively large volume of air into the blast area, as from the wheelhousing but preferably through or under the skirt 47 whereby the air which enters the blast area can assist in sweeping the dust, dirt, fines and spent abrasive particles from the surface for entrainment with the air and material travelling up the rebound corridor.

Another assist comprises the gradual reduction in cross section of the rebound corridor whereby an increase in the velocity of air during passage through the rebound corridor provides additional energy for carrying the rebounding particles for traverse through the rebound corridor.

A further beneficial effect can be secured by forming the rebound corridor to extend continuously upwardly at a reverse smooth curvature so that no obstruction will be encountered by the rebounding particles thereby to enable continuous flow through the rebound corridor, while at the same time guiding the rebounding particles in the direction towards the supply hopper at a level above the hopper, whereby gravitational forces can subsequently be relied upon for return of the spent abrasive to the hopper for feeding the wheel.

Referring now to FIGS. 2 and 3, the upper end of the rebound corridor 46 communicates with the inlet 50 to the collecting chamber of the separator 56 for separation of air, dust and dirt from abrasive particles 65 and for recycle of the abrasive particles as feed to the wheel.

In the parent application Ser. No. 925,116, the separator portion is described as being formed with a downwardly inclined passage which extends from the inlet to the lower end portion of a vertically disposed, elongate, continuous chamber having an outlet at its upper end which connects with a passage that leads to a conventional dust collector (not shown) such as a centrifugal separator, electrostatic precipitator, and preferably, in a portable unit of the type described, a bag filter which utilizes an exhaust fan for drawing the air and entrained dust and dirt through the separator to the filtered air through which dust and dirt is filtered out before exhaust of the cleaned air into the atmosphere.

In the preferred modification described in the copending application, the upper end of the chamber is provided with a partitioning wall that extends upwardly for a distance short of the top wall to provide a passage communicating the upper end of the chamber with a downwardly extending portion which causes a sharp reversal in the direction of movement of the air, dust and dirt, whereby separation efficiency is increased.

It has been found that the recovery efficiency for recycle of spent abrasive particles to the feed hopper is undesirably low by reason of the fact that an excessive amount of shot or other abrasive particles are removed from the system with the dust, dirt and other material drawn from the system to the dust collector. While the separation efficiency for the dust and dirt is of the order desired, the removal of abrasive particles with the dust and dirt reduces the amount recovered for recycle. This not only increases the cost of materials utilized in operation of the machine but it also undesirably decreases the length of time that the machine can be operated before reloading. It also increases the work required to be performed by the dust collector and the wear on the parts thereof.

It has been found, in accordance with the practice of this invention, that the recovery of abrasive particles can be increased to reduce the amount lost by entrainment with the dirty air drawn into the dust collector. This has been accomplished by emission of the stream from the outlet of the rebound chamber at a rather sharp angle downwardly into the separating chamber and almost immediately completely reversing the direction of flow through an angle of about 180° for return backwardly and upwardly in a reverse direction for a short distance, followed by a further change in direction upwardly and inwardly at an angle of about 90°±30° into a vertical passage leading to the dust collector. In the preferred practice, the passage through which the stream is first directed from the outlet of the rebound chamber and the passage through which the stream travels in the reverse direction are about the same cross section so that the velocity of the streams passing through the passage remain substantially the same for continued entrainment of the dust and dirt while being sufficient to supplement the gravitational effect with the centrifugal force for disengagement of the heavier abrasive particles from the moving air stream. The further change in direction at the upper end of the reverse flow of the dirty air stream operates on the abrasive particles remaining to effect further separation as the abrasive particles continue to lose their momentum and/or in response to impact with the upper wall to bounce back into the reverse passage for return therethrough by gravitational force. Thus the sequence of directional change, suspension, gravity and impact, all within the confined space required for a portable unit, are utilized to provide for efficient recovery of abrasive particles and separation from the dirty air stream.

As illustrated in the drawing, the collecting chamber 56 is formed with a wall 51 extending angularly downwardly from the upper edge portion of the inlet 50 from the rebound corridor, in substantially parallel relation with the bottom wall 52 which extends from the bottom edge of the inlet 50 to define a downwardly extending passage 53 therebetween of substantially uniform cross section throughout its length. The wall 51 terminates a short distance from the inlet 50 to define a collecting chamber 56 contiguous with the passage and in endwise alignment therewith. The far wall 54 of the collecting chamber extends angularly upwardly and rearwardly in spaced substantially parallel relation with the wall 51 but for a distance beyond the terminus of the wall to define a reverse passage 55 therebetween which is contiguous with the collecting chamber 56 and extends rearwardly from the upper end portion thereof with the wall 51 forming a common wall between the passages 53 and 55. Since wall 51 receives direct impingement from the entering abrasive particles, it should preferably be of wear resistant material and readily replaceable.

A wall 57 extends angularly upwardly and inwardly from the upper edge of the wall 51. The angular rearwardly and upwardly extending top wall portion 54 of the collecting chamber terminates short of the wall 57 in a V-shaped section to provide a wall 58 which extends angularly forwardly and upwardly in substantially parallel relation with the wall 57 to define a passage 59 therebetween as a continuation of the passage 55 but extending substantially at about right angles therefrom. The passage 59 empties into an upwardly extending passage 60 which communicates about a curvilinear hump 61 with the exit 62 to the dust collector.

Thus the flow from the outlet of the rebound corridor is down through passage 53 and is turned sharply through an angle of about 180° for return up the passage 55 and then forwardly and upwardly through passage 59 into the channel 60 leading to the dust collector. The major portion of the heavier abrasive particles will become separated from the dirty air stream as the stream turns from the first passage 53 for entry into the passage 55. The separated abrasive particles will naturally fall to the bottom of the collecting chamber 56. Most of the remainder of the abrasive particles will become separated from the air stream as they lose momentum during travel up the passage 55 and upon impact with the wall 57. The additional abrasive particles separated in passage 55 will slide down the wall 51 and be dumped into the collecting chamber 56.

The angular relation of the wall 51 and the wall 58 is such that they form guides over which the particles separated in passages 55 and 59 and in the upwardly extending passage 60 will slide for return by gravitational force to the collecting chamber.

It is desirable, though not necessary, to design the passages 53, 55 and 59 of substantially uniform cross section so that the velocity of the dirty air stream passing therethrough will remain relatively constant for retaining the lighter dust and dirt particles in suspension therein. On the other hand, the reversal of direction, coupled with the impact of the particles on the confronting walls of the passages, operate in combination with gravitational force to remove the abrasive particles from the dirty air stream with means for guiding the separated abrasive particles to the collecting chamber.

The separated abrasive particles which settle in the collecting chamber 56 are, for the most part, sufficiently clean for recycle to the wheel. Thus it is desirable to join the collecting chamber as a part of the feed hopper with means for making up deficiencies in the recycle by drawing fresh abrasive from a storage bin. Thus the return at which abrasive is withdrawn from a storage bin is minimized during operation of the apparatus thereby to enable use of a storage bin of smaller capacity, while extending the use and flexibility of use of the mobile surface treated apparatus.

The withdrawal of fresh abrasive 64 from the storage bin is automatically controlled by the level of recycled abrasive particles in the collecting chamber 56 as illustrated in FIGS. 2 and 3 of the drawing. The storage bin 70 is a large container, preferably of rectangular shape, the bottom wall of which funnels, as illustrated by the tapering side walls 72, into downwardly inclined passages 74 that terminate at their lower ends at the bottom portion of the collecting chamber for direct communication between the storage hopper 70 and the lower end portion of the collecting chamber spaced a short distance from the level at which the bottom of the collecting chamber merges into the feed hopper 38. The bottom of the hopper 38 is provided with an outlet opening 77 that connects to the feed pipe 78 through which abrasive particles are metered to the wheel.

In operation, abrasive particles 65 recycled from the separator collect in the collecting chamber 56. As long as the recycled abrasive is at a level above the outlet 75 of the passage 74 from the storage bin 70, the outlet 75 is blocked to militate against flow of fresh abrasive particles from the storage bin into the collecting chamber. However, when the amount of spent abrasive particles recycled is depleted so that the level in the collecting chamber is below the opening 75, the deficiency is made up by gravitational flow of fresh abrasive particles from the storage bin 70 into the collecting chamber for flow with the recycled abrasive particles to the feed hopper 76.

In the preferred modification, illustrated in the drawings, the interior wall of the collecting chamber extends for a short distance into the upper end of the hopper 38 to subdivide the space above the hopper into the collecting chamber 56 and a chamber 80. The chamber 80 is provided with a removable cover 82 for access to the interior thereof for visual monitoring of abrasive flow and for cleanout of abrasive control valve 40. The storage bin 70 is provided with an access opening fitted with a removable cover 84 in the top wall for access to fill the storage bin with fresh abrasive material.

The apparatus described provides for a minimum of fresh abrasive particles to be used to maintain proper delivery of abrasive to the blast wheel. While the system described for separation is not effective to remove 100% of the dust and dirt from the recycled abrasive particles, the small amount that remains does not interfere with the smooth flow of abrasive particles, including the recycled abrasive particles plus any makeup of fresh abrasive particles. Thus any dust or dirt remaining with the abrasive particles will pass directly through the wheel and will again flow with the abrasive particles for return to the separating section.

It will be understood that the separator and feed section described can be adapted for use with other abrasive particle blast systems and that use can be made thereof without a dust separator or with other conventional dust separators but, in the event of the absence of a dust separator, use should be made of an exhaust fan in communication with the outlet 62 for maintaining air flow through the separator from the inlet 50 to the outlet 62.

It will be understood that changes may be made in the details of construction, arrangement and operation without departing from the spirit of the invention, especially as defined in the following claims.

I claim:

1. An apparatus for treatment of surfaces by projecting dry particulate material at high velocity onto the surface, including a projecting means for projecting the particulate material, a feed hopper, means for feeding particulate material from the feed hopper to the projecting means, and means for returning particulate material, dust and dirt from the surface to a level above the feed hopper, the improvement comprising separating means for separation of particulate material from dust and dirt for recycle of the separated particulate material to the feed hopper including a separating chamber, the lower end portion of which communicates with the feed hopper, an inlet opening in a lower portion of the separating chamber but above the feed hopper and through which the returning particulate material, dust and dirt are introduced into the separating chamber and an outlet in communication with an upper portion of the separating chamber, means for causing an air stream to flow continuously from the inlet to the outlet of the separating chamber, for causing the air stream to flow in sequence downwardly and forwardly for a short distance from the inlet into the separating chamber and then in a reverse direction for flow upwardly and rearwardly in the opposite direction through the separating chamber, with a further change in direction to flow upwardly and inwardly into the passage communicating with the outlet from the separating chamber whereby particulate material becomes separated for return to the feed hopper while dust and dirt remains suspended in the air stream for flow with the air stream through the outlet opening.

2. An apparatus as claimed in claim 1 in which the means for causing the air stream to flow in the described sequence of directions comprises a separating wall which extends angularly downwardly from the upper edge of the inlet for a short distance into the separating chamber with one wall of the separating chamber spaced below and another wall spaced above the separating wall to define a downwardly extending flow path from the inlet and a reverse upwardly extending flow path from the inner edge of the separating wall.

3. An apparatus as claimed in claim 2 in which the means causing further change in direction comprises an outer wall extending angularly upwardly from the outer end portion of the separating wall and a wall extending in the same direction from the upper edge portion of the other wall of the separating chamber which is spaced above the separating wall.

4. An apparatus as claimed in claim 1 which includes means automatically controlling the addition of particulate material to the recycled particulate material in advance of the feed hopper to provide for continuous feed to the projecting means comprising a storage bin for holding a supply of abrasive particles, an inlet opening in the storage bin for replenishing the abrasive particles and an outlet opening at the bottom portion of the storage bin, a passage communicating the storage bin with the hopper comprising an upper substantially vertically disposed portion and a contiguous lower portion extending angularly downwardly from the vertically disposed portion with the vertically disposed portion having an inlet at its upper end in communication with the outlet of the storage bin and the angularly disposed portion having an outlet at its lower end at a level corresponding to the level of abrasive particles desired for insuring supply of abrasive particles for continuous projection from the projecting means whereby flow of abrasive particles from the outlet of the angularly disposed portion is blocked when recycled abrasive particles are at a level above the outlet and abrasive particles flow from the passage when the level of abrasive particles falls below the outlet.

5. A surface treating apparatus as claimed in claim 1 in which an inner wall defining the lower end portion of the collecting chamber extends a short distance into the feed hopper to subdivide the space above the feed hopper into the collecting chamber and a chamber having an access opening in an outer wall for visual monitoring of abrasive flow and for cleanout of abrasive control valve.

6. A surface treating apparatus as claimed in claim 1 in which the surface treating apparatus is portable for movement over the surface being treated.

7. A surface treating apparatus as claimed in claim 6 in which the projection means comprises a wheel mounted for rotational movement about a central axis and blades extending radially outwardly in equal circumferentially spaced apart relation whereby abrasive particles deposited on the inner end portion of said blades are thrown centrifugally outwardly from the ends of said blades onto the surface to be treated.

8. A surface treating apparatus as claimed in claim 7 in which the abrasive particles are thrown angularly through a blast corridor onto the surface and which includes a rebound corridor about a reflective angle to the blast corridor through which the abrasive particles, dust and dirt rebound for return to the separator.

* * * * *